(12) United States Patent
Parnin et al.

(10) Patent No.: US 9,964,039 B2
(45) Date of Patent: May 8, 2018

(54) AUXILIARY LUBRICANT SUPPLY PUMP STAGE INTEGRAL WITH MAIN LUBRICANT PUMP STAGE

(71) Applicant: United Technologies Corporation, Hartford, CT (US)

(72) Inventors: Francis Parnin, Suffield, CT (US); Denman H. James, Windsor, CT (US); Larry W. Spires, Unionville, CT (US)

(73) Assignee: United Technologies Corporation, Farmington, CT (US)

( * ) Notice: Subject to any disclaimer, the term of this patent is extended or adjusted under 35 U.S.C. 154(b) by 480 days.

(21) Appl. No.: 14/765,024

(22) PCT Filed: Feb. 5, 2014

(86) PCT No.: PCT/US2014/014788
§ 371 (c)(1),
(2) Date: Jul. 31, 2015

(87) PCT Pub. No.: WO2014/130239
PCT Pub. Date: Aug. 28, 2014

(65) Prior Publication Data
US 2015/0369128 A1    Dec. 24, 2015

Related U.S. Application Data

(60) Provisional application No. 61/768,729, filed on Feb. 25, 2013.

(51) Int. Cl.
*F02C 7/06* (2006.01)
*F01D 25/20* (2006.01)

(52) U.S. Cl.
CPC ............... *F02C 7/06* (2013.01); *F01D 25/20* (2013.01); *Y02T 50/671* (2013.01)

(58) Field of Classification Search
USPC ...................................................... 415/122.1
See application file for complete search history.

(56) References Cited

U.S. PATENT DOCUMENTS

| | | |
|---|---|---|
| 4,153,141 A | 5/1979 | Methlie |
| 4,732,236 A | 3/1988 | Jacques |
| 5,018,601 A | 5/1991 | Waddington et al. |
| 5,472,383 A | 12/1995 | McKibbin |
| 8,020,665 B2 | 9/2011 | Sheridan et al. |
| 8,205,427 B2 | 6/2012 | Schwarz et al. |

(Continued)

FOREIGN PATENT DOCUMENTS

| | | |
|---|---|---|
| EP | 0064936 A1 | 11/1982 |
| EP | 1561908 A2 | 8/2005 |

OTHER PUBLICATIONS

International Search Report and Written Opinion for International Application No. PCT/US2014/014788 dated Nov. 26, 2014.

(Continued)

*Primary Examiner* — John Fox
(74) *Attorney, Agent, or Firm* — Carlson, Gaskey & Olds P.C.

(57) ABSTRACT

A disclosed lubrication pump includes a main pump stage, an auxiliary pump stage, and scavenger pump stages. The lubrication pump therefore may be driven by a common shaft of the accessory gearbox.

17 Claims, 2 Drawing Sheets

(56) References Cited

U.S. PATENT DOCUMENTS

| | | |
|---|---|---|
| 8,230,974 B2 | 7/2012 | Parnin |
| 9,062,611 B2 * | 6/2015 | Sheridan ............... F02C 7/32 |
| 9,068,515 B2 * | 6/2015 | Duong .................. F02C 7/32 |
| 9,719,428 B2 * | 8/2017 | Winter .................. F02C 7/32 |
| 9,759,094 B2 * | 9/2017 | Hutto, Jr. ............. F04D 29/056 |
| 9,816,441 B2 * | 11/2017 | Cass ..................... F02C 7/32 |
| 2006/0260323 A1 | 11/2006 | Moulebhar |
| 2008/0096714 A1 | 4/2008 | McCune |
| 2009/0159139 A1 * | 6/2009 | Cornet ................. F01D 25/20 137/511 |
| 2009/0235630 A1 | 9/2009 | Norris |
| 2010/0212281 A1 | 8/2010 | Sheridan |
| 2011/0284328 A1 | 11/2011 | Brandt et al. |

OTHER PUBLICATIONS

International Preliminary Report on Patentability for International Application No. PCT/US2014/014788 dated Sep. 3, 2015.
Extended European Search Report for EP Application No. 14754870.5 dated May 19, 2016.

* cited by examiner

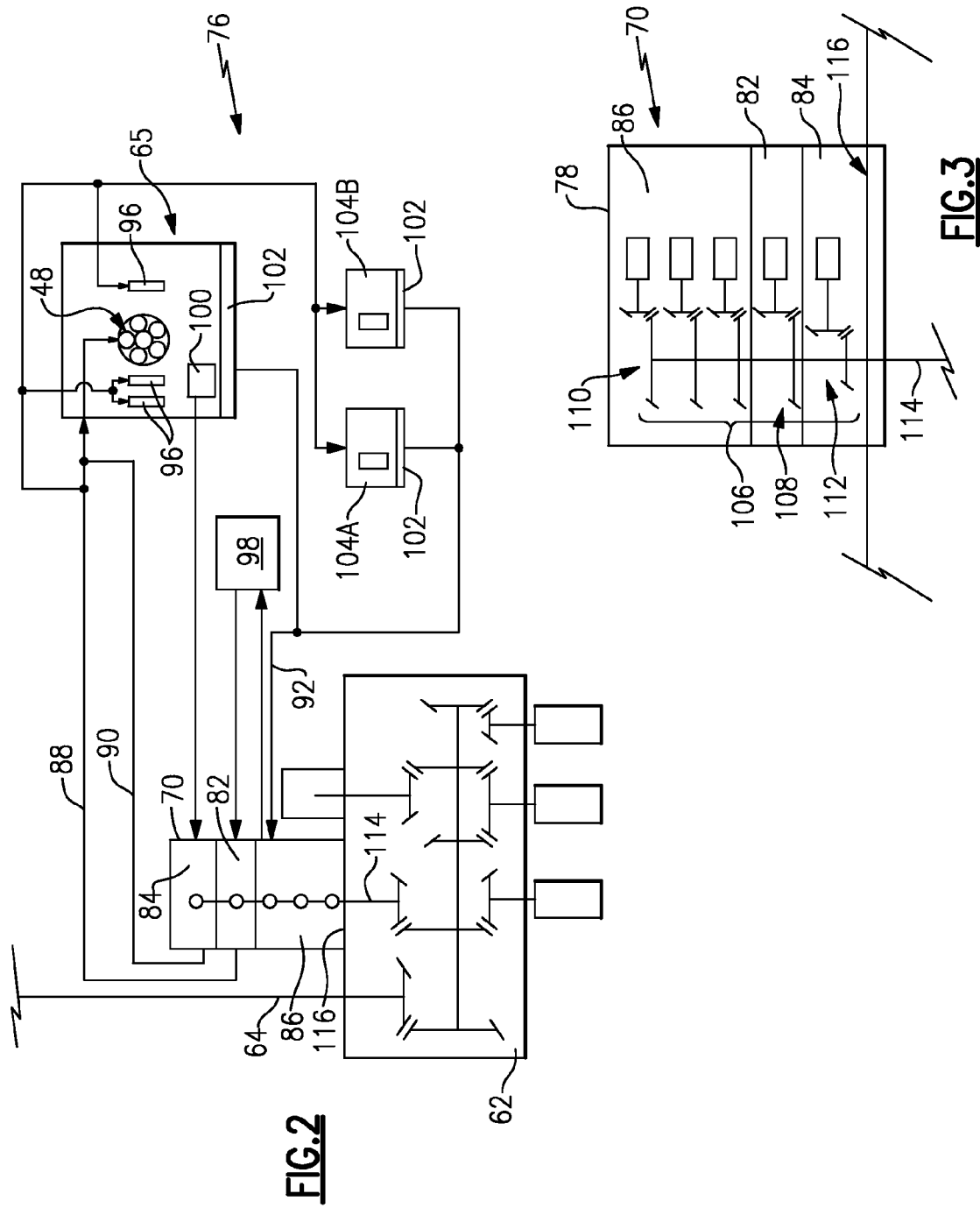

AUXILIARY LUBRICANT SUPPLY PUMP STAGE INTEGRAL WITH MAIN LUBRICANT PUMP STAGE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly requires constant lubrication and therefore both a main and auxiliary lubrication circuit and corresponding pump are provided. The main pump and auxiliary pump are typically driven by an accessory gearbox. Each of the main and accessory pumps is mounted separately to the accessory gearbox. Each additional component mounted to the accessory gearbox adds weight and complexity.

Although geared architectures have improved propulsive efficiency, turbine engine manufacturers continue to seek further improvements to engine performance including reductions to overall system weight and complexity that can improve overall propulsive efficiency.

SUMMARY

A lubrication system for a gas turbine engine according to an exemplary embodiment of this disclosure, among other possible things includes an accessory gearbox including a plurality of driven shafts, a pump housing mounted to the accessory gearbox including a drive train driven by one of the plurality of driven shafts, a main pump stage supported within the pump housing and driven by a first portion of the drive train, at least one scavenge pump stage supported within the pump housing and driven by a second portion of the drive train, and an auxiliary pump stage supported within the pump housing and driven by a third portion of the drive train.

In a further embodiment of the foregoing lubrication system, the accessory gearbox includes a plurality of mounting locations for a corresponding plurality of driven accessories and the pump housing is mounted to one of the plurality of mounting locations.

In a further embodiment of any of the foregoing lubrication systems, includes a main circuit in fluid communication with the main pump stage, at least one scavenge circuit in fluid communication with the scavenge pump stage, and an auxiliary circuit in fluid communication with the auxiliary pump stage.

In a further embodiment of any of the foregoing lubrication systems, the auxiliary circuit directs lubricant from an auxiliary lubricant supply to a fan drive gear system.

In a further embodiment of any of the foregoing lubrication systems, the auxiliary lubricant supply directs lubricant to journal bearings of the fan drive gear system.

In a further embodiment of any of the foregoing lubrication systems, the pump housing includes separate portions of each of the main circuit, the scavenge circuit and the auxiliary circuit.

In a further embodiment of any of the foregoing lubrication systems, the third portion of the drive train includes a third shaft driven by the at least one shaft of the plurality of driven shafts of the accessory gearbox.

In a further embodiment of any of the foregoing lubrication systems, the third portion of the drive train comprises a third gear set.

A gas turbine engine according to an exemplary embodiment of this disclosure, among other possible things includes a fan section including a plurality of fan blades rotatable about an axis, a compressor section, a combustor in fluid communication with the compressor section, a turbine section in fluid communication with the combustor, a geared architecture driven by the turbine section for rotating the fan about the axis, an accessory gearbox including a plurality of driven shafts, a pump housing mounted to the accessory gearbox including a drive train driven by one of the plurality of driven shafts, a main pump stage supported within the pump housing and driven by a first portion of the drive train, the main pump stage directing lubricant to the geared architecture from a main lubricant supply, at least one scavenge pump stage supported within the pump housing and driven by a second portion of the drive train, and an auxiliary pump stage supported within the pump housing and driven by a third portion of the drive train, the auxiliary pump stage directing lubricant to the geared architecture from an auxiliary lubricant supply.

In a further embodiment of the foregoing gas turbine engine, the accessory gearbox includes a plurality of mounting locations for a corresponding plurality of driven accessories and the pump housing is mounted to one of the plurality of mounting locations.

In a further embodiment of any of the foregoing gas turbine engines, includes a main circuit in fluid communication with the main pump stage. At least one scavenge circuit is in fluid communication with a corresponding one of the scavenge pump stage and an auxiliary circuit in fluid communication with the auxiliary pump stage.

In a further embodiment of any of the foregoing gas turbine engines, the geared architecture includes epicyclical gear assembly and the auxiliary pump stage directs lubricant from the auxiliary lubricant supply to journal bearings of the epicyclical gear assembly.

In a further embodiment of any of the foregoing gas turbine engines, the auxiliary lubricant supply directs lubricant to the journal bearings to supplement lubricant supplied from the main pump stage.

In a further embodiment of any of the foregoing gas turbine engines, the third portion of the drive train includes a third shaft driven by the at least one shaft of the plurality of driven shafts of the accessory gearbox.

In a further embodiment of any of the foregoing gas turbine engines, the third portion of the drive train includes a third gear set.

A method of operating a lubrication system for a gas turbine engine according to an exemplary embodiment of this disclosure, among other possible things includes driving an accessory gearbox including a plurality of driven shafts disposed at a corresponding plurality of mounting locations, mounting a pump housing to one of the plurality of mounting locations of the accessory gearbox, driving a drive train supported within the pump housing with one of the plurality of driven shafts corresponding with the mounting location of the pump housing, driving a main pump stage supported within the pump housing with a first portion of the drive train, driving at least one scavenge pump stage supported within the pump housing with a second portion of the drive train, and driving an auxiliary pump stage supported within the pump housing with a third portion of the drive train.

In a further embodiment of the foregoing method, includes directing lubricant through a main circuit with the main pump to an epicyclical gear assembly during a first operating condition and directing lubricant through an auxiliary circuit with the auxiliary pump stage during a second operating condition to supplement lubricant from the main circuit.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic representation of a lubrication system for a gas turbine engine.

FIG. 3 is a schematic view of an example lubrication pump.

DETAILED DESCRIPTION

Figure 1:
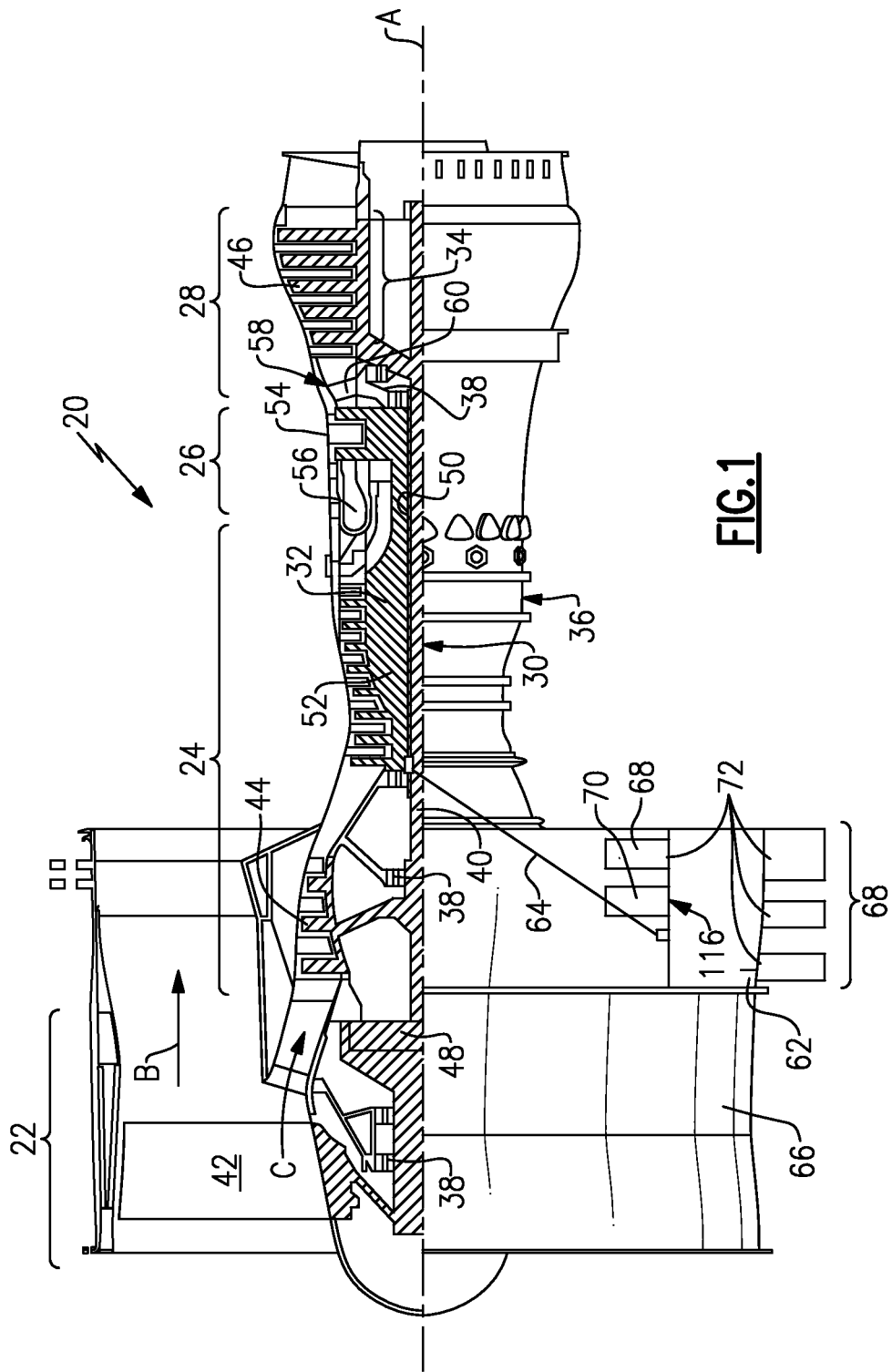
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Air flow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The fan section 22 includes a fan case 66. The fan case 66 supports an accessory gearbox 62. The accessory gearbox 62 supports a plurality of accessories 68 that are driven by a power take off shaft commonly referred to as a tower shaft schematically indicated at 64. The tower shaft 64 is driven by one of the shafts 40, 50 of the gas turbine engine 20.

The accessory gearbox 62 is utilized to drive components such as generators; de-oilers, integrated drive generators, and air turbine starters. Moreover, the accessory gearbox is utilized to drive a lubrication pump 70. The lubrication pump 70 pumps lubricant from supply tanks to required portions of the engine that utilized lubricant.

Referring to FIG. 2 with continued reference to FIG. 1, the example lubrication supply system 76 is schematically shown and includes the lubrication pump 70 that is mounted to a mounting location 116 that is one of a plurality of mounting locations 72 disposed on the accessory gearbox 62.

The example lubrication pump 70 houses a main pump stage 82 and a scavenger pump stage 86. The scavenger pump stage 86 draws lubricant through a scavenge circuit 92 from various sumps 102 after lubricant is supplied through the lubricated structures. In this example, lubricant is supplied from a main supply 98 through a main lubricant circuit 88 to a fan drive gear system 94 and also various bearing assemblies 104a and 104b. Lubricant from the main circuit 88 is supplied to the fan drive gear system 94 that in this example comprise an epicyclic gear structure 48 that includes journal bearings 96. Lubricant is supplied to the journal bearings 96 and to the gear structure 48 and the drains into a sump 102. Some portion of lubricant drains into an auxiliary supply 100. The auxiliary supply feeds an auxiliary supply circuit 90.

The fan drive gear system 94 comprises gears that utilized to drive the fan section 22. These gears require lubricant at all times during operation. In some operational conditions such as zero gravity or other negative g maneuvers encountered during operation, less than a desired amount of lubricant may be available through the main lubricant passage 88. Accordingly, the auxiliary circuit 90 provides lubricant from the auxiliary supply 100 to the fan drive gear system 94 during these alternate or secondary conditions.

Typically the auxiliary pump stage 82 is mounted separately from the main pump housing 78 on the accessory gearbox 62. However, the separate mounting of the auxiliary gear pump stage 82 requires that the gearbox 62 or other engine location include additional drive features to drive the auxiliary pump stage 82.

In the disclosed example lubrication pump 70, an auxiliary stage pump 82 is disposed within the common housing 78 with the main pump stage 82 and the scavenger pump stages 86. Each of the scavenger pump stages 86, auxiliary pump stages 84, and main pump stages 82 are driven by way of a common shaft 114 of the accessory gearbox 62. Moreover, the example lubrication pump 70 includes but does not require more than one mounting location 116 on the accessory gearbox 62.

Referring to FIG. 3, the example lubrication pump 70 includes the main pump stage 82, auxiliary pump stage 84, and the scavenger pump stages 86. In this example, a plurality of scavenger pump stages 86 are shown. The example lubrication pump 70 includes a single gear train 106 driven by the single shaft 114 from the accessory gearbox 62. A main pump stage 82 is driven by a first portion of the drive train 106. The auxiliary pump stage 84 is driven by a third portion 112 of the drive train 106 and the scavenger pump stage 86 is driven by a second part 110 of the drive train 106. Each of the first, second and third portions 108, 110, 112 are each driven by way of a common shaft 114 of the accessory gearbox 62.

Accordingly, the example lubrication pump 70 eliminates the need for a separate drive shaft and mounting location on the accessory gearbox 62. Eliminating the an additional mounting location and drive shaft on the accessory gearbox 62 enables an overall reduction in weight along with reducing complexity of construction of the accessory gearbox 62 and lubrication system 76.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubrication system for a gas turbine engine comprising:
   an accessory gearbox including a plurality of driven shafts;
   a pump housing mounted to the accessory gearbox including a drive train driven by one of the plurality of driven shafts;
   a main pump stage supported within the pump housing and driven by a first portion of the drive train;
   at least one scavenge pump stage supported within the pump housing and driven by a second portion of the drive train; and
   an auxiliary pump stage supported within the pump housing and driven by a third portion of the drive train.

2. The lubrication system as recited in claim 1, wherein the accessory gearbox includes a plurality of mounting locations for a corresponding plurality of driven accessories and the pump housing is mounted to one of the plurality of mounting locations.

3. The lubrication system as recited in claim 1, including a main circuit in fluid communication with the main pump stage, at least one scavenge circuit in fluid communication with the scavenge pump stage, and an auxiliary circuit in fluid communication with the auxiliary pump stage.

4. The lubrication system as recited in claim 3, wherein the auxiliary circuit directs lubricant from an auxiliary lubricant supply to a fan drive gear system.

5. The lubrication system as recited in claim 4, wherein the auxiliary lubricant supply directs lubricant to journal bearings of the fan drive gear system.

6. The lubrication system as recited in claim 3, wherein the pump housing includes separate portions of each of the main circuit, the scavenge circuit and the auxiliary circuit.

7. The lubrication system as recited in claim 1, wherein the third portion of the drive train comprises a third shaft driven by the at least one shaft of the plurality of driven shafts of the accessory gearbox.

8. The lubrication system as recited in claim 1, wherein the third portion of the drive train comprises a third gear set.

9. A gas turbine engine comprising:
a fan section including a plurality of fan blades rotatable about an axis;
a compressor section;
a combustor in fluid communication with the compressor section;
a turbine section in fluid communication with the combustor;
a geared architecture driven by the turbine section for rotating the fan about the axis;
an accessory gearbox including a plurality of driven shafts;
a pump housing mounted to the accessory gearbox including a drive train driven by one of the plurality of driven shafts;
a main pump stage supported within the pump housing and driven by a first portion of the drive train, the main pump stage directing lubricant to the geared architecture from a main lubricant supply;
at least one scavenge pump stage supported within the pump housing and driven by a second portion of the drive train; and
an auxiliary pump stage supported within the pump housing and driven by a third portion of the drive train, the auxiliary pump stage directing lubricant to the geared architecture from an auxiliary lubricant supply.

10. The gas turbine engine as recited in claim 9, wherein the accessory gearbox includes a plurality of mounting locations for a corresponding plurality of driven accessories and the pump housing is mounted to one of the plurality of mounting locations.

11. The gas turbine engine as recited in claim 9, including a main circuit in fluid communication with the main pump stage, at least one scavenge circuit in fluid communication with a corresponding one of the scavenge pump stage and an auxiliary circuit in fluid communication with the auxiliary pump stage.

12. The gas turbine engine as recited in claim 9, wherein the geared architecture comprises epicyclical gear assembly and the auxiliary pump stage directs lubricant from the auxiliary lubricant supply to journal bearings of the epicyclical gear assembly.

13. The gas turbine engine as recited in claim 12, wherein the auxiliary lubricant supply directs lubricant to the journal bearings to supplement lubricant supplied from the main pump stage.

14. The gas turbine engine as recited in claim 9, wherein the third portion of the drive train comprises a third shaft driven by the at least one shaft of the plurality of driven shafts of the accessory gearbox.

15. The gas turbine engine as recited in claim 9, wherein the third portion of the drive train comprises a third gear set.

16. A method of operating a lubrication system for a gas turbine engine comprising:
driving an accessory gearbox including a plurality of driven shafts disposed at a corresponding plurality of mounting locations;
mounting a pump housing to one of the plurality of mounting locations of the accessory gearbox;
driving a drive train supported within the pump housing with one of the plurality of driven shafts corresponding with the mounting location of the pump housing;
driving a main pump stage supported within the pump housing with a first portion of the drive train;
driving at least one scavenge pump stage supported within the pump housing with a second portion of the drive train; and
driving an auxiliary pump stage supported within the pump housing with a third portion of the drive train.

17. The method as recited in claim 16, including directing lubricant through a main circuit with the main pump to an epicyclical gear assembly during a first operating condition and directing lubricant through an auxiliary circuit with the auxiliary pump stage during a second operating condition to supplement lubricant from the main circuit.

* * * * *

UNITED STATES PATENT AND TRADEMARK OFFICE
CERTIFICATE OF CORRECTION

PATENT NO. : 9,964,039 B2  
APPLICATION NO. : 14/765024  
DATED : May 8, 2018  
INVENTOR(S) : Francis Parnin, Denman H. James and Larry W. Spires Page 1 of 1

It is certified that error appears in the above-identified patent and that said Letters Patent is hereby corrected as shown below:

In the Claims

In Claim 6, Column 7, Line 19; replace "the scavenge circuit" with --the at least one scavenge circuit--

In Claim 7, Column 7, Line 22-23; replace "the at least one shaft of the plurality of driven shafts" with --one of the plurality of driven shafts--

In Claim 14, Column 8, Line 23-24; replace "the at least one shaft of the plurality of driven shafts" with --one of the plurality of driven shafts--

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*